United States Patent [19]

Ferlatte

[11] Patent Number: 5,311,090
[45] Date of Patent: May 10, 1994

[54] MOTOR PROTECTION DEVICE

[76] Inventor: André A. Ferlatte, P.O. Box 2500, 402 Renfrew Street, Dalhousie, New Brunswick, E0K 1B0, Canada

[21] Appl. No.: 978,763

[22] Filed: Nov. 19, 1992

[30] Foreign Application Priority Data

Mar. 20, 1992 [CA] Canada .................................. 2063612

[51] Int. Cl.$^5$ ........................ H02K 5/10; H02K 5/00
[52] U.S. Cl. ........................................ 310/88; 310/89
[58] Field of Search ...................... 310/58, 59, 62, 63, 310/88, 89

[56] References Cited

U.S. PATENT DOCUMENTS

| | | | |
|---|---|---|---|
| 1,989,139 | 1/1935 | Koch, Jr. | 310/58 |
| 2,055,931 | 9/1936 | Keely | 310/63 |
| 2,769,105 | 10/1956 | Altschwager et al. | 310/88 |
| 2,778,958 | 1/1957 | Hamm et al. | 310/57 |
| 2,785,325 | 3/1957 | Keyner | 310/78 |
| 3,407,317 | 10/1968 | Honsinger | 310/58 |
| 3,461,328 | 8/1969 | Drouard | 310/52 |
| 4,086,507 | 4/1978 | Roland et al. | 310/88 |
| 4,244,098 | 1/1981 | Barcus | 310/64 |
| 4,742,257 | 5/1988 | Carpenter | 310/62 |
| 4,786,833 | 11/1988 | Knobel | 310/89 |
| 4,908,538 | 3/1990 | Gerberth, Jr. | 310/89 |
| 5,019,737 | 5/1991 | Bruno | 310/89 |

FOREIGN PATENT DOCUMENTS

| | | | |
|---|---|---|---|
| 2819978 | 11/1979 | Fed. Rep. of Germany | 310/63 |
| 1049666 | 12/1953 | France | 310/88 |
| 0139145 | 6/1991 | Japan | 310/63 |
| 1026242 | 6/1983 | U.S.S.R. | 310/63 |

Primary Examiner—Steven L. Stephan
Assistant Examiner—C. LaBalle
Attorney, Agent, or Firm—McFadden, Fincham

[57] ABSTRACT

A cover device for use with a fan-cooled motor which is generally exposed to harsh conditions during the operating cycle. A fan enclosure having an inlet port is provided which further includes a splash cover extending longitudinally of the motor body. The structure substantially obviates debris accretion in the heat sink of the motor and at the fan to promote cool running for long periods of time.

12 Claims, 4 Drawing Sheets

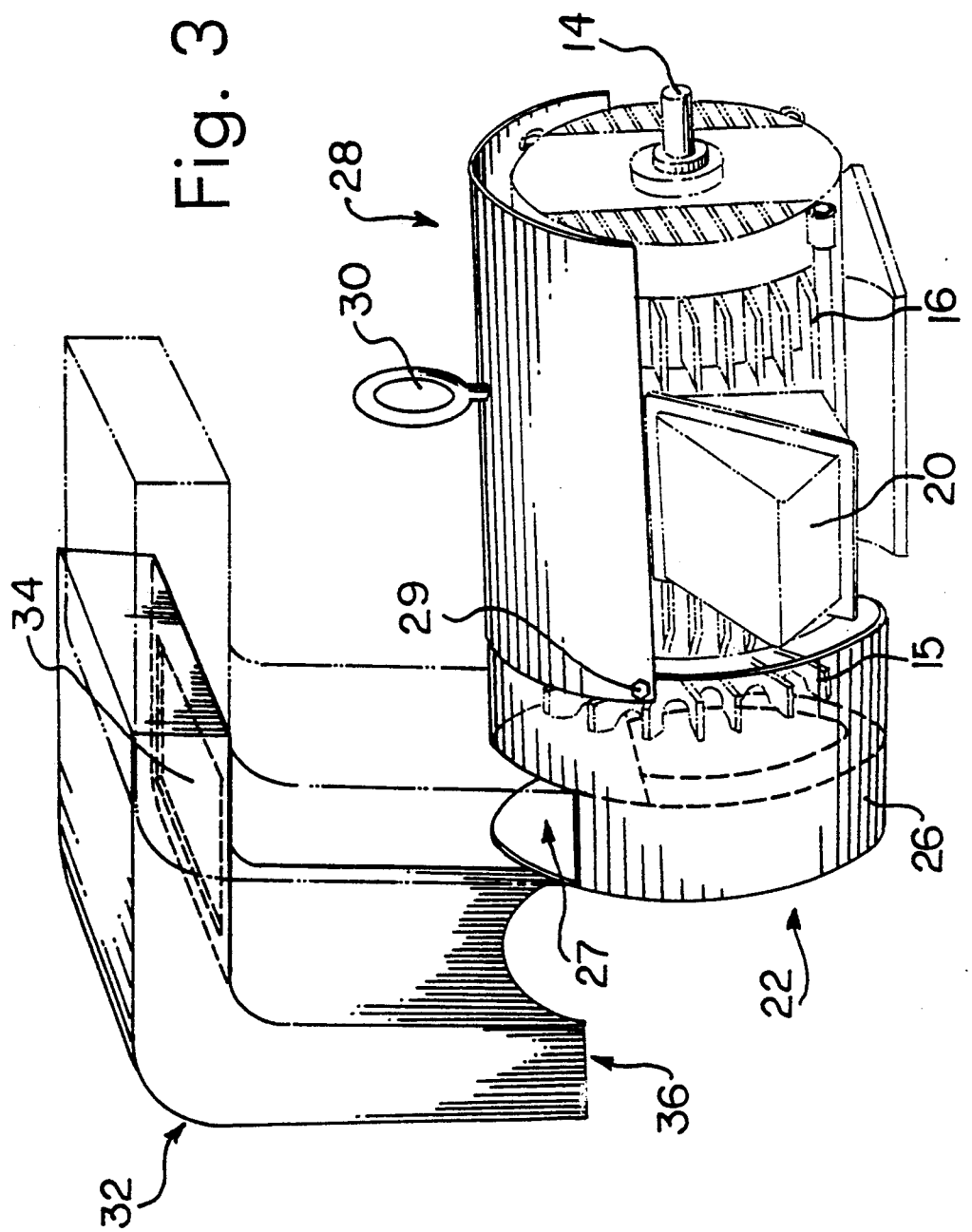

MOTOR PROTECTION DEVICE

FIELD OF THE INVENTION

The present invention relates to motors and, more particularly, it relates to a device for partially enclosing the motor to thereby reduce exposure to moisture chemicals, dust and other forms of debris.

BACKGROUND OF THE INVENTION

Generally, motors, e.g. TEFC type motors are primarily employed in the chemical, petroleum, mining, pulp and paper and lumber industries. As such, the motors are required to run continuously for long periods of time in an environment deluged with moisture, chemicals, dirt, dust and other forms of debris. Clearly, such conditions have a dramatic effect on motor life, which eventually leads to costly repair, higher energy costs and concomitant productivity disruption.

The prior art has attempted to circumvent the problem by producing various forms of covers and enclosures, typical of which is U.S. Pat. No. 4,886,320.

The patentee discloses a fan assembly providing an enclosure for the fan or impeller to facilitate more efficient running of the motor. This reference does not teach a motor for use under the adverse operating conditions as set forth herein and accordingly, does not provide a shield for the motor housing or fan housing adapted to substantially prevent passage of debris therethrough.

Further, U.S. Pat. No. 2,726,343, provides a ventilated dynamoelectric motor in which end brackets, associated with the frame, include vents. Such a structure does not alleviate the problems addressed with the present invention since such ventilation permits fluid and particulate matter to enter the motor; this eventually leads to possible damage to the windings, bearings etc. of the motor. In addition, to the aforementioned, the periphery of the frame lacks a shell to prevent the accretion of material thereon.

U.S. Pat. No. 5,006,742 discloses a splash-proof cover for an electric motor providing sockets to permit connection with a power supply. This reference, although providing a splash cover, does not provide a fan enclosure and housing shield for substantially reducing exposure of fluid and particulate material to the fan and housing.

Additional prior art generally within the field of the present invention includes U.S. Pat. Nos. 4,631,433, 3,719,843, 4,945,270 and 4,931,681.

SUMMARY OF THE INVENTION

In view of the prior art and requirements in industry, there exists a need for a protective device suitable for use with heavy duty motors which facilitate enhanced motor life by a reduction in debris exposure during long periods of time. The present invention is directed to fulfilling this need and one object is to provide a debris cover suitable for use with a horizontally disposed motor having a fan at one end and a shaft at an opposed end therefrom for protecting the motor from contact with debris, the improvement comprising:

fan enclosure means for enclosing the fan, the enclosure means including an inlet to permit the passage of air therein; and shield means connected to the enclosure means, the shield means adapted to at least partially surround the periphery of the motor and extend longitudinally thereof at least to the opposed end.

In the case where splashing is a problem from overhead the inlet, in a preferred form for this type of application, the device is positioned on the lower most portion of the enclosure means. This substantially eliminates air intake from the top of the motor and accordingly, reduces intake of foreign material therein.

In an alternate form, the enclosure may be rotated 180° relative to the longitudinal axis of the motor to releasably mount an intake adapter, e.g. a gooseneck. This form of the present invention is particularly useful when spills and/or debris occur primarily from a position beneath the motor. In this arrangement, air substantially devoid of debris may enter the gooseneck to cool the motor.

Optionally, a suitable filter means may be included with the intake and the gooseneck may include a flexible neck to facilitate convenient repositioning.

Generally, such motors include radially oriented fins which provide an effective heat sink for the motor. Under harsh environmental operating conditions and further during long period of use, the motor radiates a significant amount of heat and accordingly it is imperative that the fins and periphery of the housing remain free of accumulated debris to permit effective radiation of heat.

The use of the shield means is particularly effective to this end. The shielding means is connected with the fan enclosure means and in one form, extends along the top thereof to protect the motor from overhead spills.

A further object of the present invention is to provide a device for protecting a motor from premature wear due to debris exposure thereto comprising, in combination:

a motor adapted for use in a horizontal disposition, the motor having a fan at one end and a shaft at an opposed end and radially oriented fins associated with a body of the motor;

fan enclosure means for enclosing the fan, the enclosure means including an inlet to permit the passage of air therein; and shield means connected to the enclosure means, the shield means adapted to at least partially surround the periphery of the motor and extend longitudinally thereof at least to the opposed end.

A still further object of the present invention is to provide a protective device for protecting a motor from fluid and particulate debris, the motor having a housing and including a fan at one and a shaft at a second end spaced from the first end comprising:

a fan cover member adapted to enclose the fan having an impervious end wall and a peripheral wall, the peripheral wall having an inlet associated therewith to permit the passage of air therein; and a shield member connected to the cover member at least partially surrounding the housing and extending longitudinally of the housing at least to the second end.

The shield and enclosure means, in some applications, may be suitably connected for rotation relative to one another to permit protection of the motor from a variety of positions.

In an alternate embodiment, the shield means may provide a junction box cover member either integral with the shield means or as an auxiliary member for use therewith.

Having thus generally described the invention, reference will now be made to the accompanying drawings, illustrating preferred embodiments.

BRIEF DESCRIPTION OF THE DRAWINGS

FIG. 3 is a perspective view of a second embodiment of the present invention;

DETAILED DESCRIPTION OF THE PREFERRED EMBODIMENTS

Figure 1:
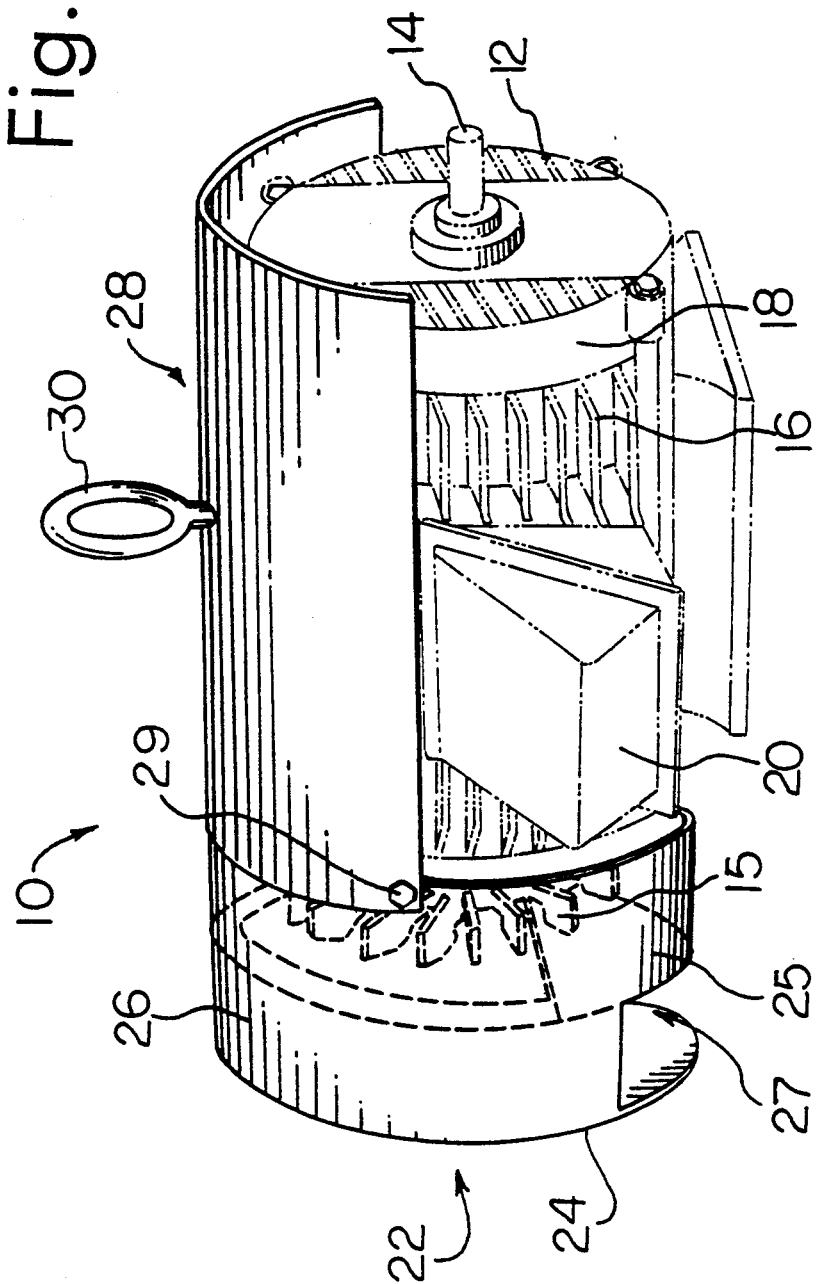
FIG. 1 is a perspective view of a first embodiment of the present invention.
Figure 2:
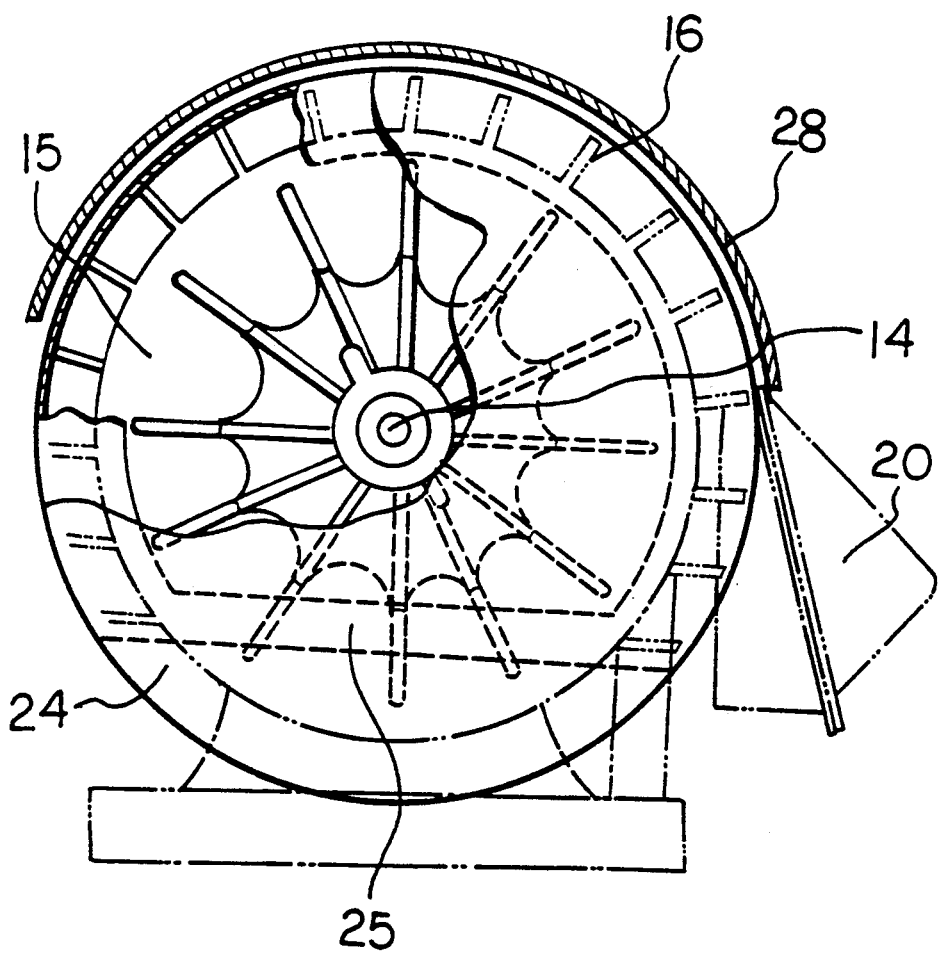
FIG. 2 is a partially cut-away view of one end of the device of FIG. 1.

Referring now to the drawings, FIG. 1 illustrates a perspective view of the device according to the present invention, generally represented by numeral 10 as positioned about a motor 12. Generally, the motor 12 includes a shaft 14 at one end and fan or impeller 15 at the opposite end. Radial fins 16 radiate from the periphery of housing 18. A junction box 20 is provided to facilitate connection with a power supply.

The protective device 10 of the present invention provides a fan enclosure means 22 comprising a generally cylindrical body having an end plate 24 and a peripheral wall 26 extending therearound. The peripheral wall 26, at a lower point thereof, includes an opening 27 defining an inlet to facilitate air intake therein to thereby cool the motor. An internal baffle wall 25 extends inwardly of the fan enclosure 22 at the lower most portion thereof. Baffle wall 25 and end plate 24 cooperate to produce the air pressures necessary to provide adequate suction to thereby draw air into the enclosure 22. As an attendant advantage, the arrangement substantially reduces inadvertent entry of material into enclosure means 22.

A filter means (not shown) e.g. screen, mesh, etc., may be provided at the opening to prevent foreign matter from entering the fan enclosure 22.

In the example, a shield means 28 is provided which is connected by, for example, a bolt to peripheral wall 26 at a top portion thereof spaced from the opening. The shield means 28 extends longitudinally of the housing 18 to at least the shaft end and is arcuately shaped to at least partially surround housing 18. As is evident from the drawings, the fan enclosure means 22 and shield means 28 are mounted such that the same are sufficiently spaced from the components they are adapted to protect to thereby facilitate unimpeded operation and air flow.

Mounting means of a suitable construction may be employed to mount the device 10 to motor 12 e.g. magnetic clamps, brackets, etc.

In a preferred form, enclosure means 22 is bolted at 29 to motor frame 18. In the example, an eyebolt 30 is employed; this has an ancillary feature in that it permits rapid relocation of the motor 12, when required, via suitable means e.g. winch means.

The embodiment described herein is particularly useful in protecting the fan 15 and housing 18 from overhead spills thus overcoming the serious difficulty of material collection on the housing 18 and more particularly, between the radial fins 16 thereof. This arrangement reduces the intake of debris collecting on the motor 12.

FIG. 3 illustrates a second embodiment of the present invention in which similar numerals denote similar components from the previously described embodiment. In this embodiment, a gooseneck adapter 32 may be releasably connected for fluid communication with the opening 27 in wall 26 of fan enclosure means 22. The enclosure means, in cases where the motor housing 18 and enclosure means 22 are symmetrical in cross-section, may simply be rotated 180° relative to the longitudinal axis of the motor housing 18 and the gooseneck 32 connected. In an alternative, the device 10 may be removed from motor housing 18 and the fan enclosure means 22 and shield means 28 rotated relative to one another. In the example, the adapter 32 is a hollow L-shaped member having an intake port 34; a second end 36 communicates with the opening of the peripheral wall 26. Optionally, port 34 may include filter means as discussed herein previously for opening wall 26.

The adapter 32 may include a flexible joint between port 34 and end 36 to permit convenient repositioning of the adapter to conform to the specific requirements of each application.

Connection between end 36 and the opening of wall 26 may be made by any suitable means e.g. friction fit, magnetic attraction, clamps, fasteners, etc.

The arrangement set forth in this embodiment is particularly useful from preventing debris, originating from beneath the motor 12, from entering the intake port 34.

Similar to the previous embodiment, this embodiment advantageously permits the intake air to be dispersed longitudinally and axially over the fins 16 beneath the shield means 28. Accordingly, the motor may run cool for long periods of time.

Suitable materials contemplated for fabrication of the device 10 include, for example, cast iron, aluminum, steel, stainless steel, sheet metal, suitable composite materials, polymers and resins.

In terms of the polymeric, composite and resin materials, the device may be molded as an integral unit; where metal material is used, a two-piece unit may be fabricated. Further still, the device may comprise a multi-piece unit and it will be clear to those skilled in the art that the precise number of elements constituting the device 10 is purely a question of design for particular intended application.

Figure 4:
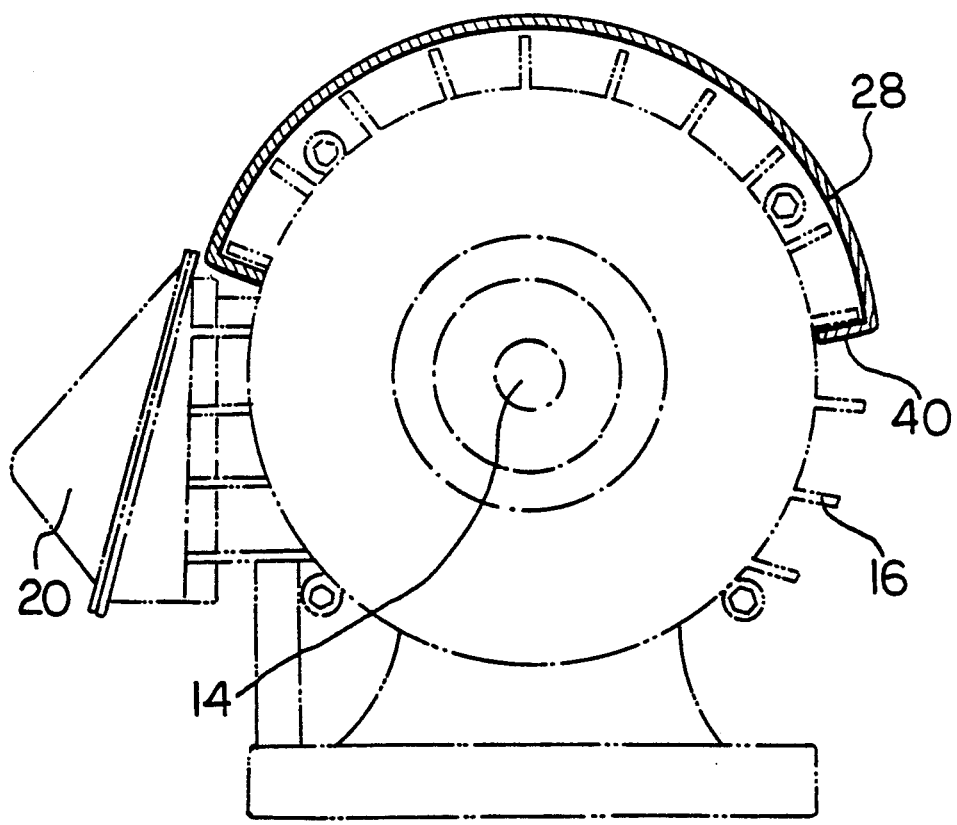
FIG. 4 is an end view of yet another embodiment according to the present invention.

FIG. 4 shows a further embodiment according to the present invention. Similar numerals are representative of common elements disclosed herein previously.

Figure 5:
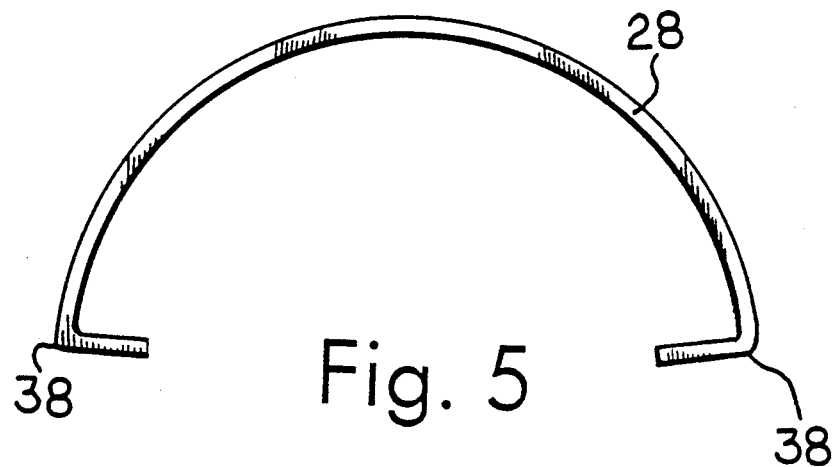
FIG. 5 is an end view of the shield member illustrated in FIG. 4.

In this embodiment, the shield means 28 comprises a suitable resilient material and includes adjacent each opposed longitudinal edge 38 thereof, a lip 40 extending inwardly for abutting and frictional contact with fins 16, shown more clearly in FIG. 5.

This feature will readily permit the shield means 28 to be longitudinally and axially slid on motor housing 18 to adjust the distance the same extends over the shaft end. This is convenient where the shaft end may require the connection of ancillary equipment for a particular application.

Although specific embodiments of the present invention have been described above, it is not limited thereto and it will be apparent to those skilled in the art that numerous modifications form part of the present invention insofar as they do not depart from the spirit, nature and scope for the claimed and described invention.

I claim:

1. A fabricated motor protection device for attachment to a horizontally disposed motor having a casing, a fan external to said casing at one end for circulating cooling air over said casing, and a shaft extending from said casing at the other end, said device comprising:
   a fan enclosure attached to an extending from said casing at said one end of said casing and enclosing said fan, said enclosure having an impervious end wall;
   an arcuate shield separate from said casing connected to said enclosure and extending longitudinally over said casing and surrounding a portion of said casing, said shield spaced from said casing to define an air passage over said casing; and
   a directionally oriented inlet in said enclosure for entry of air into said enclosure, whereby foreign matter is prevented from contacting said casing and also prevented from direct entry into said enclosure.

2. The device as defined in claim 1, wherein said enclosure comprises a cylindrical member having an end wall and a peripheral wall associated therewith.

3. The device as defined in claim 2, said inlet positioned in said peripheral wall.

4. The device as defined in claim 2, wherein said enclosure is rotatable relative to said shield means.

5. The device as defined in claim 2, wherein said enclosure includes an intake adapter.

6. The device as defined in claim 1, wherein said peripheral wall includes an interior baffle wall extending within said enclosure.

7. The device as defined in claim 6, wherein said baffle extends within said enclosure means at the lower most portion thereof.

8. A motor shield protection device for attachment to a horizontally disposed motor having a closed casing, a fan externally of the casing at one end thereof for circulating cooling air over said casing, and a shaft extending from the casing at the other end, the protection device comprising:
   a fan enclosure for removable attachment to the motor casing, at the one end of the casing to enclose said fan, the enclosure comprising a tubular member having a peripherally extending wall and an end wall at one side of the peripherally extending wall, the enclosure open at the other side of the peripherally extending wall;
   a shield attached to said enclosure and extending longitudinally from the open side of the enclosure for positioning over the casing, spaced therefrom, and defining an air passage, said shield including spaced apart longitudinal edges, said edges each including a lip extending inwardly and adapted for frictional engagement with radial fins on said motor; and
   a directionally oriented inlet in the enclosure for entry of air into the enclosure and prevention of entry of foreign matter into the enclosure.

9. The device as defined in claim 8, wherein said shield comprises an arcuate member.

10. The device as defined in claim 9, wherein said enclosure is rotatable relative to said shield means.

11. The device as defined in claim 8, wherein said enclosure includes an intake adapter.

12. A protective device as claimed in claim 8, the inlet in the peripherally extending wall, the end wall, being imperforate.

* * * * *